US008505196B2

(12) United States Patent
Altenhoven et al.

(10) Patent No.: US 8,505,196 B2
(45) Date of Patent: Aug. 13, 2013

(54) METHOD AND DEVICE FOR SECURING A CRYSTAL WITH A COUNTER STRIP

(75) Inventors: Thierry Altenhoven, Courrendlin (CH); Adolf Engelmann, Arch (CH); Jean-Christophe Kroug, Avry-sur-Matran (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 284 days.

(21) Appl. No.: 13/028,006

(22) Filed: Feb. 15, 2011

(65) Prior Publication Data

US 2011/0197445 A1 Aug. 18, 2011

(30) Foreign Application Priority Data

Feb. 15, 2010 (EP) .................................... 10153597

(51) Int. Cl.
*B23P 19/00* (2006.01)

(52) U.S. Cl.
USPC ..... 29/807; 29/10; 29/231; 29/232; 29/896.3; 368/74; 368/294

(58) Field of Classification Search
USPC ............ 29/10, 231, 232, 807, 896.3; 368/74, 368/294
See application file for complete search history.

(56) References Cited

U.S. PATENT DOCUMENTS

| | | | | |
|---|---|---|---|---|
| 4,363,555 | A * | 12/1982 | Finger | 368/291 |
| 4,468,134 | A * | 8/1984 | Halicho | 368/309 |
| 4,866,823 | A * | 9/1989 | Magnien et al. | 29/10 |
| 5,321,670 | A | 6/1994 | Rebeaud et al. | |
| 6,575,619 | B1 * | 6/2003 | Stauffer | 368/299 |

FOREIGN PATENT DOCUMENTS

| | | | |
|---|---|---|---|
| CH | 250 114 | A | 8/1947 |
| CH | 251 697 | A | 11/1947 |
| CH | 262 326 | A | 6/1949 |
| CH | 273 737 | A | 2/1951 |
| EP | 0 568 059 | A1 | 11/1993 |
| EP | 0 683 440 | A1 | 11/1995 |
| EP | 0 770 937 | A1 | 5/1997 |
| FR | 1 272 508 | A | 9/1961 |

OTHER PUBLICATIONS

Search Report issued in the corresponding European application 10 15 3597, completed Jul. 29, 2010.

* cited by examiner

*Primary Examiner* — Richard Chang
(74) *Attorney, Agent, or Firm* — Griffin & Szipl, P.C.

(57) ABSTRACT

Method of securing a watch bezel 1 including a case 3 and a crystal 2, characterized in that it includes a step of snap fitting the bezel 1 onto the crystal 2, during which snap fit means 6 are guided by guide means 5 arranged on case 3.

14 Claims, 3 Drawing Sheets

METHOD AND DEVICE FOR SECURING A CRYSTAL WITH A COUNTER STRIP

This application claims priority from European Patent Application No. 10153597.9 filed Feb. 15, 2010, the entire disclosure of which is incorporated herein by reference.

FIELD OF THE INVENTION

The present invention relates to the field of watch making. More specifically, it concerns a method of securing a bezel on a watch. The invention also concerns a securing device for implementing this securing method.

BACKGROUND OF THE INVENTION

For assembling watch bezels and crystals, so-called "friction fit" mountings are known, which often require sealing gaskets to absorb the radial compression forces of the crystal on the bezel. These methods are often used for top of the range watches using metal bezels and crystals made of very hard material, such as corundum or sapphire, the cost price of which is very high.

For plastic bezels and crystals, alternative mounting methods to the driving in method are known, which use for example bonding, ultrasound welding, or snap fit—also called clip-fit—mounting of securing elements by elastic deformation during assembly. However, bonding requires laborious implementation for mass production for precise and repeated positioning of the parts to be assembled; and ultrasonic welding requires heavy investment. Finally, snap fit mounting often requires machining complex geometries to ensure efficient holding, and play often quickly appears between the various assembled elements after the creep deformation of the plastic material.

There is therefore a need for a solution that allows a bezel to be secured without any of the aforementioned drawbacks of the prior art, notably proposing a simple assembly method that is easy to implement, with reduced production costs.

SUMMARY OF THE INVENTION

These objects are achieved by a method of securing a watch bezel 1, wherein the watch includes a case 3 and a crystal 2, and the method is characterized in that it includes a step of snap fitting bezel 1 onto crystal 2, during which snap fit means 6 are guided by guide means 5 arranged on case 3. These objects are also achieved owing to a device for securing a watch bezel 1, including a case 3 and a crystal 2, wherein the device is characterized in that the bezel 1 includes snap fit means 6 and the case 3 includes guide means 5 for snap fit means 6.

One advantage of the proposed solution is that the bezel is secured to the crystal and not straight onto the case, which facilitates assembly.

Another advantage of the proposed solution is that it guarantees improved robustness and holding of the bezel, with a very strict limitation of vertical play compared to the usual clip fit solutions.

An additional advantage is that no particular tools are required for assembly.

Thus, in accordance with a first, non-limiting illustrative embodiment of the present invention, a method of securing a watch bezel is provided, wherein the watch includes a case and a crystal, and the method includes a step of snap fitting the bezel onto the crystal, wherein the snap fit means of the bezel are guided by guide means arranged on the case during the snap fit step, and that the guide means also serve as means for holding the snap fit means against the crystal. In accordance with a second, non-limiting illustrative method embodiment of the present invention, the first non-limiting embodiment is modified so that it includes a prior step of securing the crystal to the case. In accordance with a third, non-limiting illustrative embodiment of the present invention, the second non-limiting embodiment is modified so that the axial positioning of the crystal relative to the bezel is ensured by axial positioning means arranged respectively on the internal face of the bezel and the top face of a peripheral edge of the bezel during the snap fit step. In accordance with a fourth, non-limiting illustrative embodiment of the present invention, the third non-limiting embodiment is further modified so that the snap fit step consists in an elastic deformation of the snap fit means, then positioning a snap fit surface of the snap fit means underneath a snap fit surface of the crystal located on a peripheral edge of the crystal. In accordance with a fifth, non-limiting illustrative embodiment of the present invention, the fourth non-limiting embodiment is further modified so that the snap fit means of the bezel is guided during the snap fit step partly towards the interior of the case by a first surface of the guide means, which is oblique relative to the direction of assembly. In accordance with a sixth, non-limiting illustrative embodiment of the present invention, the fifth non-limiting embodiment is further modified so that the bezel is embedded in that case, after the snap fit step.

In accordance with a seventh, non-limiting illustrative embodiment of the present invention, a device for securing a watch bezel is provided, wherein the watch includes a case and a crystal, and wherein the bezel includes snap fit means and the case includes guide means for the snap fit means, and the guide means also serve as means for holding the snap fit means against the crystal. In accordance with an eighth, non-limiting illustrative embodiment of the present invention, the seventh non-limiting embodiment is modified so that the snap fit means are located on a peripheral edge of the bezel and wherein the guide means are located in a recess at the periphery of the case. In accordance with a ninth, non-limiting illustrative embodiment of the present invention, the eighth non-limiting embodiment is further modified so that the snap fit means forms a single unit with the bezel and contains a protruding portion on which at least one snap fit surface is arranged. In accordance with a tenth, non-limiting illustrative embodiment of the present invention, the ninth non-limiting embodiment is further modified so that the guide means forms a single unit with the case. In accordance with an eleventh, non-limiting illustrative embodiment of the present invention, the tenth non-limiting embodiment is further modified so that the bezel covers the peripheral edge of the crystal, an internal lateral edge of the bezel is flush with an external lateral edge of the crystal, and a top external edge of the crystal is extending a top an external face of the bezel. In accordance with a twelfth, non-limiting illustrative embodiment of the present invention, the eleventh non-limiting embodiment is further modified so that at least the bezel and/or the crystal and/or the case is formed of plastic material. In accordance with a thirteenth, non-limiting illustrative embodiment of the present invention, the twelfth non-limiting embodiment is further modified so that the bezel includes axial positioning means arranged on the internal face of the bezel, and the crystal includes axial positioning means arranged on the top face of a peripheral edge of the bezel. In accordance with a fourteenth, non-limiting illustrative embodiment of the present invention, the thirteenth non-limiting embodiment is further modified so that the guide means includes a first guide surface substantially parallel to the snap fit surfaces of the bezel and the snap fit means.

Thus, manufacturing costs are reduced for various embodiments of the present invention because the tools required for machining and assembling the parts are simplified. Furthermore, the reduced implementation time increases the work output and, thus, increases production efficiency.

BRIEF DESCRIPTION OF THE DRAWINGS

Other features and advantages will appear more clearly in the detailed description of various embodiments and the annexed drawings, in which.

DETAILED DESCRIPTION OF THE INVENTION

The invention uses the notion of snap fit or clip fit mounting which involves the elastic deformation of elements during assembly, without however requiring friction forces to maintain the assembled position, unlike the driving in method, also called setting particularly within the field of jewelry. Snap fit mounting also differs from the driving in method in that the deformation forces acting on the snap fit elements are supposed to dissipate once the snap fit has taken place, since the snap fit elements then return to the normal shape they had at rest prior to the snap fit operation.

Figure 1:
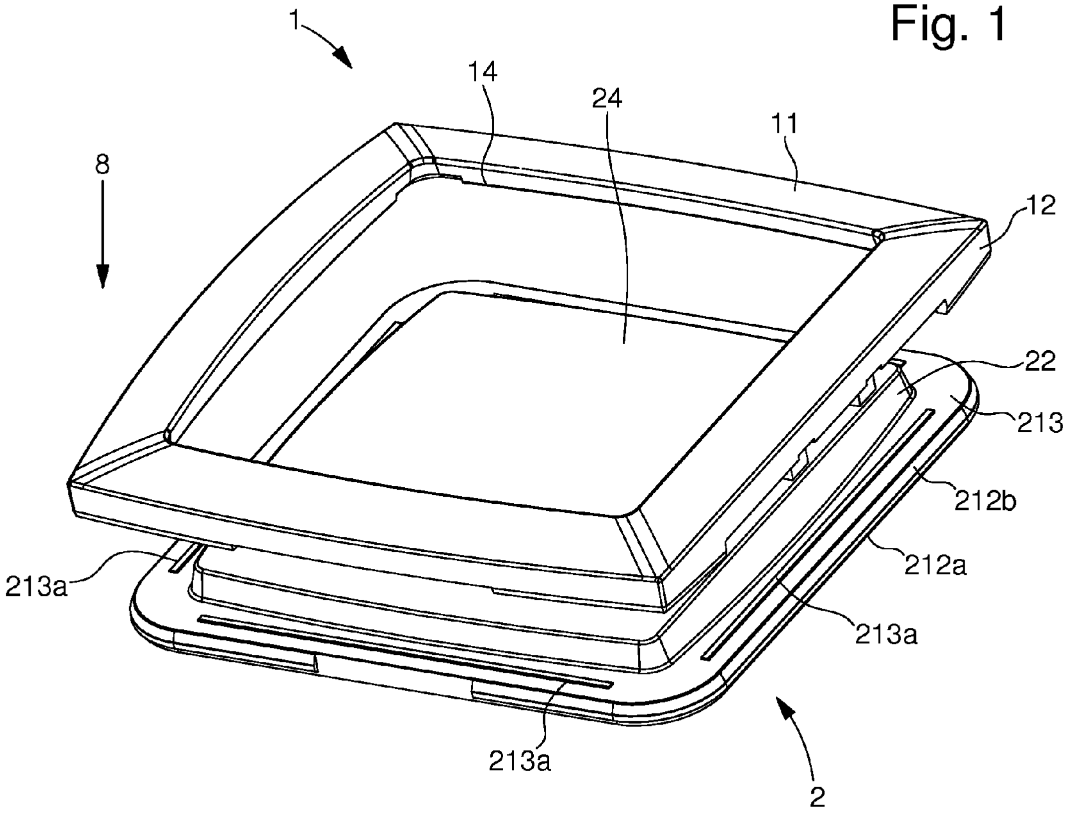
FIG. 1 shows a perspective view of a bezel and a crystal according to a preferred embodiment of the invention, seen from above.

FIG. 1 illustrates a bezel 1 and a crystal 2, not assembled to each other, according to a preferred variant of the invention, which concerns a square plastic bezel 1 and crystal 2, seen from above.

On bezel 1 are shown the external, lateral, substantially vertical walls 12 and an external top face 11 forming a virtually horizontal, slightly domed surface to better match the contours of the surface of crystal 2, and particularly the external top face of crystal 24. As will be seen later, particularly in the FIG. 5 view, the inner lateral edge 14 of bezel 1 is intended to be flush with the external lateral wall 22 of crystal 2, once assembly has been carried out. This assembly is carried out in the vertical direction 8 indicated by the arrow. This direction is substantially perpendicular to the plane formed by the external top face of crystal 2.

FIG. 1 also shows that crystal 2 has a peripheral edge 21, on the top face 213 of which are arranged small flanges 213*a*, preferably on each of the four faces of the square crystal. These flanges 213*a* constitute means for axially positioning bezel 1 relative to crystal 2. They cooperate with the inner annular flange 13*a* of the bezel, seen in the following Figure, so as to limit the radial travel of the bezel during the snap fit operation, and lateral play after the snap fit operation. This annular flange 13*a* located on the bezel forms complementary means for axially positioning bezel 1 relative to crystal 2, since it will reach a stop on each of flanges 213*a* during the snap fit operation, explained in detail below with reference to FIG. 5.

Also visible on crystal 2 are two distinct surfaces of lateral wall 212 of the peripheral edge of crystal 21; a vertical surface 212*a* and a slightly inclined part 212*b* above the vertical surface 212*a*. This arrangement allows snap fit elements 6 (not shown in this Figure) to deform gradually during assembly and at the same time facilitates the sliding thereof. It can also be seen that vertical wall 212*a* is much lower than the inclined wall, so that the maximum deformation is exerted on snap fit elements 6 shown in the following Figure, for as short a time as possible. By minimising the length of time during which the most intense deformation forces are applied, it also reduces the creep deformation onto snap fit elements 6.

According to the preferred variant illustrated not only in FIG. 1, but also in all the other Figures, the bezel is square; however, any other geometrical shape (round, oval, trapezoid . . . ) could be envisaged within the scope of the invention. Similarly, the slant of the walls forming the edge of the crystal or bezel could be altered for aesthetic or functional considerations, such as, for example, the machinability of the parts, without altering the method or the securing device of the invention.

Figure 2:
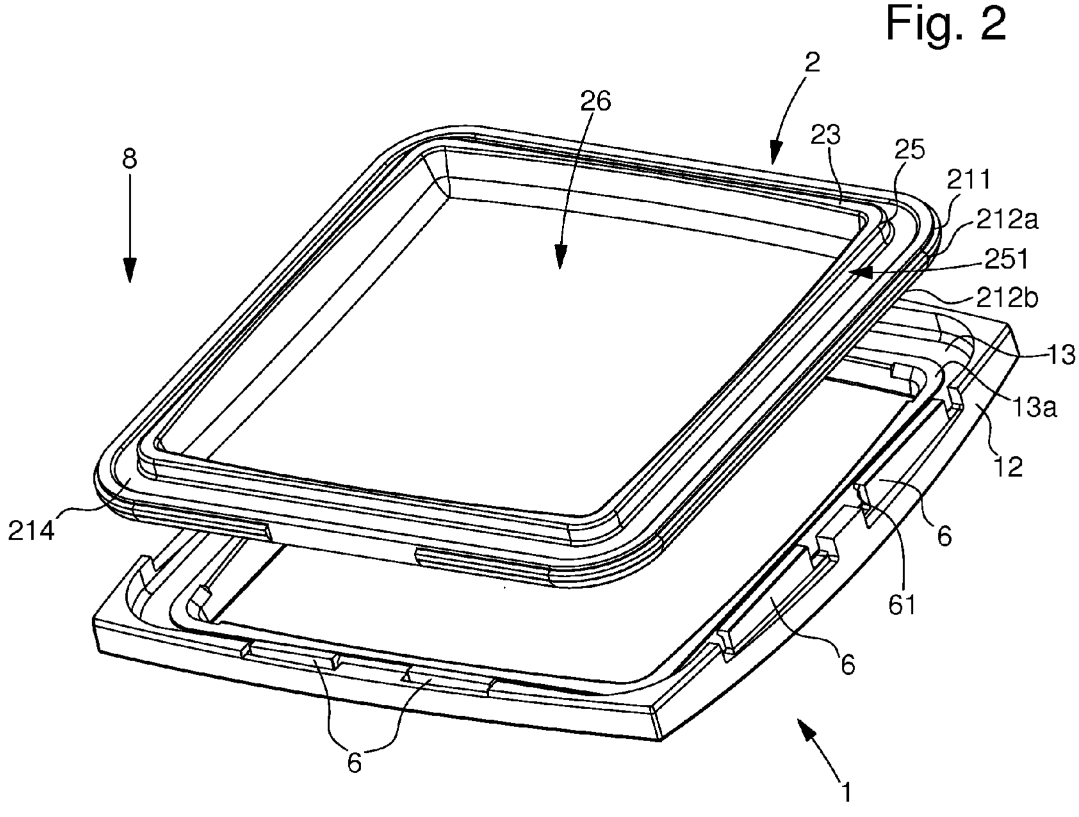
FIG. 2 shows a perspective view of a bezel and a crystal according to a preferred embodiment of the invention, seen from below.

FIG. 2, which illustrates a symmetrical view with respect to FIG. 1 relative to the horizontal plane, shows the internal faces of the crystal 26 and the bezel 13. The peripheral edge 21 of the crystal is still clearly visible. The inner face 214 of the crystal can now be seen, as well as the crystal support 25 whose external face 251 is visible which is intended to come into contact with case 3, shown in the next Figure, via contact surface 23. Although, according to this variant, crystal support 25 extends uninterrupted along the 4 faces of crystal 2, it is possible to imagine the support being formed by feet, for example one on each face, intended to be forcibly fitted inside orifices in case 3. The advantage of the variant of this preferred illustrated embodiment is that it increases the contact surface 23 and thus allows crystal 2 to be held better on case 3 when it is secured, for example, by bonding.

A surface 211 above surfaces 212*a* and 212*b*, which were already seen in the preceding Figure, can also now be seen in the preferred embodiment illustrated in FIG. 2. This surface 211 is the snap fit surface of crystal 2. It cooperates with snap fit elements 6 located on the different faces of bezel 1, which each preferably contain more than one snap fit element 6, for example two as shown in FIG. 2. Each snap fit element 6 includes a protruding part 61 forming a snap fit nose section that includes a snap fit surface 611 visible below in FIG. 5 but not in this Figure, which cooperates with snap fit surface 211 of crystal 2 to hold the bezel in a fixed position on crystal 2. This surface 211 is oriented slightly obliquely relative to direction of assembly 8 so as, like inclined surface 212*b*, to enable snap fit elements 6 to slide better relative to the crystal during the snap fit. The reverse deformation for return to the rest position thus also occurs more gradually.

Although theoretically it should be pointing in the opposite direction for reasons of symmetry, the direction for assembling bezel 1 on crystal 2, indicated by arrow 8, is the same direction as in the preceding Figure. With the geometrical shapes used for bezel 1, this allows the bezel 1 to be secured to crystal 2, while the crystal is kept stationary during the driving in step. This feature may be advantageous for simplifying the tools necessary for assembly, by avoiding complex and expensive tools such as hydraulic or pneumatic presses, since a simple bracket may be sufficient to fix the bezel to the crystal. Since it is, generally, easier to grip bezel 1 than crystal 2, this method of fixing bezel 1 onto crystal 2 could be preferred, wherein direction of assembly 8 goes from bezel 1 towards crystal 2 (upwards in the Figure). However, within the scope of the invention, it is also possible to envisage fixing crystal 2 onto bezel 1 with an opposite direction of assembly 8 as shown in FIG. 2.

Figure 3:
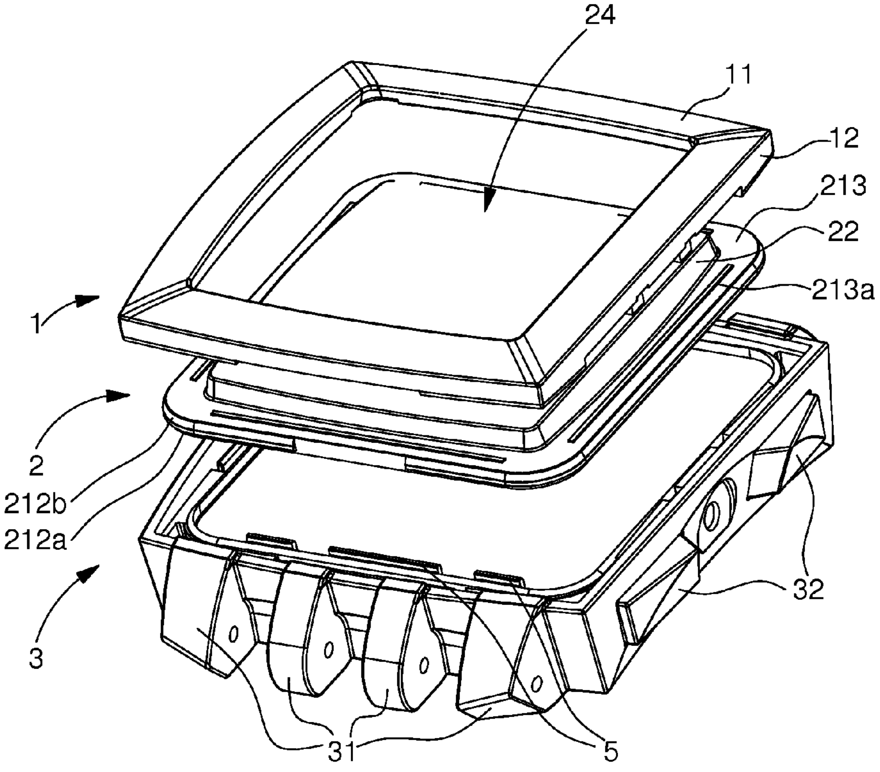
FIG. 3 shows a perspective view of a bezel, a crystal and a case according to a preferred embodiment of the invention, seen from above.

FIG. 3 is complementary to FIG. 1, showing a perspective top view of bezel 1 and crystal 2, as in FIG. 1, but now with a case 3 below crystal 2. Since the parts are assembled on top of each other in the order indicated in the Figure, i.e. crystal 2 on case 3 and bezel 1 on crystal 2, all the references are therefore identical to those of FIG. 1 as regards the bezel 1 (external top face 11 and external lateral face 12) and crystal 2 (external top crystal face 24, external lateral crystal edge 22, top face 213 of the peripheral crystal edge, the top face flange 213*a* of the peripheral crystal edge, and the side wall 212 of the peripheral crystal edge 21, with the two sub-parts formed by vertical and inclined surfaces 212*a* and 212*b* respectively). Visible on case 3 are means 31 for securing a bracelet or strap and push-buttons 32. Guide means 5, which will be used when bezel 1 is assembled on crystal 2, and centring surfaces 34 for mounting crystal 2 in case 3, which allow proper axial positioning of crystal 2 with respect to case 3, are also particularly displayed. There are preferably two of these centring surfaces 34 per face, but they do not necessarily go all round case 3. The fact that machining precision is not required over the entire periphery of case 3 saves costs both as regards tools and the time required for fabricating the case 3-crystal 2-bezel 1 assembly.

Figure 4:
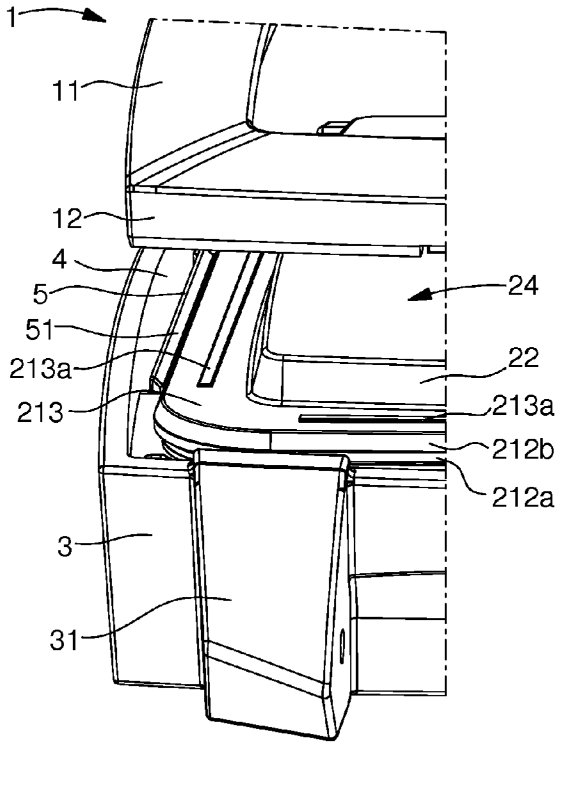
FIG. 4 shows a partial perspective view of a bezel, a crystal and a case according to a preferred embodiment of the invention, seen from above once the crystal has been assembled to the case.

FIG. 4 illustrates an enlarged partial view of the same elements as the preceding Figure, but this time crystal 2 is affixed to the case 3. According to a preferred embodiment of the invention, the method of securing bezel 1 according to the invention contains a prior step of fixing crystal 2 to case 3, for example by bonding. Bezel 1 is only snap fit mounted afterwards, which means that it can be snap fitted directly onto crystal 2 and not onto case 3. The slightly smaller size of crystal 2 with respect to case 3 thus enables a snap fit mounting to be achieved on the exterior of crystal 2 in a recess 4 in case 3 while concealing snap fit elements 6. If this snap fit had had to be performed directly in case 3 it would have required more complex machining inside case 3, since a concave extension of the cavity would have had to be made for snap fit mounting the snap fit elements 6.

Figure 5:
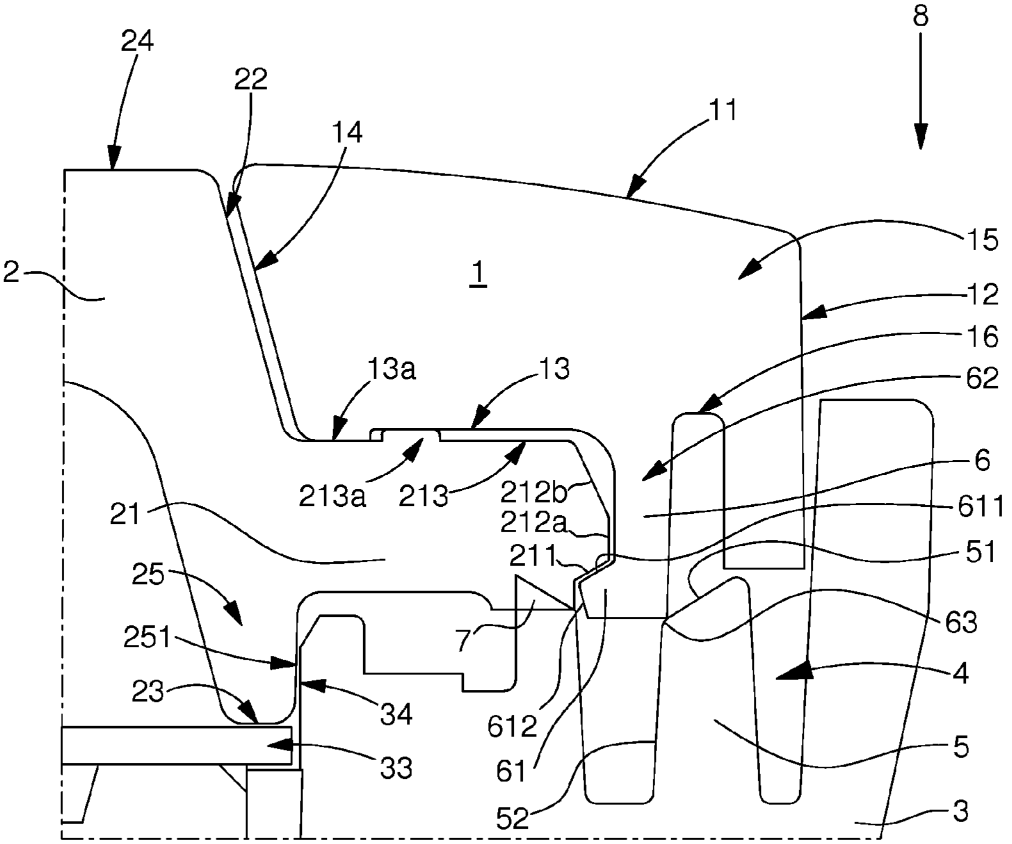
FIG. 5 shows a cross-section of the preferred embodiments illustrated in FIGS. 1 to 4 after the bezel has been assembled to the crystal.

FIG. 4 once again shows the top external face 11 and the external lateral face 12 of bezel 1, and the top external face 24 of crystal 2, the external lateral crystal edge 22, the top face 213 of the peripheral crystal edge, the top face flange 213*a* of the peripheral crystal edge and the lateral wall 212 of the peripheral crystal edge 21, with the two sub-parts formed by vertical and inclined surfaces 212*a* and 212*b* respectively. However, shown in more detail are recess 4 at the periphery of case 3, and guide means 5, which consists of "counter clips" cooperating with "clips" 6 which are the snap fit means visible for example in FIG. 2. It can be seen that guide means 5 has an inclined surface 51 at the top visible end thereof, while another surface, concealed in this Figure but shown below in the cross-section of FIG. 5, is substantially vertical. This inclined surface 51, which is oblique to the direction of assembly, enables snap fit elements 6 to be guided inside case 3.

FIG. 5 shows a cross-section of the preferred variant illustrated in the preceding Figures, which elucidates the mechanism for assembling the various parts of the invention. According to this preferred variant, the structure of the various elements involved in the snap fit mounting are respectively integrated in bezel 1 and case 3. Snap fit means 6 is in fact formed of a single unit with the bezel, on the peripheral edge 15 thereof, visible in FIG. 5 described below, while guide means 5 is also formed in a single unit in case 3. This preferred variant improves the hold between snap fit means 6 and bezel 1, on the one hand, and guide means 5 and the case, on the other hand. According to a preferred variant of the invention, the single-piece units are obtained immediately after a single moulding. They could however be obtained by follow-up machining after moulding.

FIG. 5 is a view of the assembled position after the snap fit operation. It can be seen that the snap fit means is thus formed in a single piece with the bezel, and that it contains a protruding portion 61 on which a snap fit surface 611 is arranged, which is positioned underneath a snap fit surface of crystal 211, with which it is in contact in the assembled position. The snap fit surface extends the inner face of snap fit means 62, which forms a substantially vertical wall 62 in contact with the vertical part 212*a* of the lateral wall 212 of the peripheral crystal edge 21. Bezel 1 thus grips the peripheral crystal edge 21 with a pincer action between the inner face 13 thereof and the snap fit surface 611 of the snap fit means, which extends the inner face without any interruption. It can be seen in this Figure that in the assembled position, bezel 1 covers the peripheral edge 21 of crystal 2, and that the inner lateral edge 14 of the bezel 1 is flush with the external lateral edge 22 of crystal 2, while the top external face 24 of crystal 2 extends the top external face 11 of bezel 1, such that there is no discontinuity between bezel 1 and crystal 2. The dimensions of bezel 11 could also preferably be chosen so that there is the least possible discontinuity between the external lateral wall of bezel 12 and the exterior of case 3 (not visible in FIG. 5) for aesthetic reasons and ease of handling, so as to prevent the shape of the watch thereby obtained from being too angular.

According to the preferred variant illustrated in FIG. 5, case 3 includes a dial 33 against which the inner contact surface 23 of crystal 2, arranged on the lower part of support 25 of crystal 2, is intended to be brought into contact. As previously indicated, crystal 2 may preferably be fixed to case 3 before bezel 1 is snap fitted onto crystal 2. Thus, means 7 for fixing crystal 2 to case 3 are provided, which may consist for example of adhesive, or, according to the illustrated preferred variant, a portion of case 3 which will be melted during a welding operation. The portion corresponding to fixing means 7 has been left in FIG. 5 for improved comprehension of the securing mechanism and to show fixing means 7. However, those skilled in the art will understand that in the assembled position illustrated, this portion has disappeared. It might also be noted in FIG. 5 that no securing means has been provided between inner contact surface 23 of crystal 2 and the dial. Although it is possible to use such securing means, the solution of the invention does without such means and thereby saves a superfluous assembly step.

The centring surfaces 34 of case 3, previously seen in FIG. 3, are also visible in FIG. 5. It can be seen in this cross-section that the axial positioning of crystal 2 relative to case 3 is ensured by the cooperation of centring surfaces 34 with the external faces of crystal support 251 on each of the four sides. A slight forcible fit of crystal 2 against these centring surfaces 34 could be carried out, according to a preferred variant of the invention, so as to ensure that crystal 2 holds well even without bonding or welding. Driving crystal 2 into position in this way would prevent any axial play when these two parts are subsequently secured to each other, for example by welding.

During the snap fit step, a sliding surface 612 located underneath snap fit surface 611 on the protruding portion 61 of snap fit means 6 slides over the inclined part 212*b* of the lateral wall of the peripheral crystal edge, which gradually deforms snap fit means 6 as bezel 1 is moved further in assembly direction 8. There is maximum deformation during cooperation with the vertical part 212*a* of lateral wall 212 of the peripheral crystal edge 21, and thus over a limited travel since the height of this part 212*a* of the wall is chosen to be relatively low compared to the height of the inclined part. When snap fit means 6 moves down onto this part 212*a* of the wall, the heel 63 of snap fit means 6 enters into contact with guide means 5, and more precisely with a first surface 51 of the guide means, which guides snap fit means 6 partly towards the interior of case 3, and consequently towards crystal 2, which has a tendency to straighten out snap fit means 6 returning it to the initial shape thereof. This first surface 51 of guide means 5 extends a second much more vertical surface 52, which gives guide means 5 a vertical strip shape according to the illustrated embodiment. These strips thus form a counter-strip for snap fit means 6 illustrated in the form of clips, by guiding them in the opposite direction to their direction of deformation outwards. It can be seen that this first surface 51 is not only oblique relative to direction of assembly 8, but also substantially parallel to snap fit surfaces 211 and 611 respectively of the bezel and the snap fit means.

With this arrangement of the aforementioned guide elements 5 and snap fit elements 6, it can be seen that guide means 5 also acts as means for holding snap fit means 6 against crystal 2, once bezel 1 has been assembled to crystal 2. In fact, while the thrust exerted by guide means 5 via the first guide surface 51 against heel 63 of snap fit means 6 certainly has a horizontal component, which allows inward guiding during the snap fit operation, it also has a vertical component, in the opposite direction to direction of assembly 8. Thus guide means 5 permanently press the snap fit nose section formed by protruding portion 61 against crystal 2. More specifically, the vertical component of the force exerted by guide means 5 presses snap fit surface 611 of the snap fit means against the snap fit surface 211 of crystal 2, which prevents any vertical play forming. However, the horizontal component presses part of the inner surface 62 of snap fit means 6 against the vertical part 212*a* of lateral wall 212 of peripheral crystal edge 21, which prevents any horizontal play forming, even after the creep of deformation the plastic material. According to the illustrated embodiment, the arrangement between snap fit means 6 and guide means 5 is thus such that the elastic deformation continues to exert the pressing force of protruding portion 61 of snap fit means 6 against bezel 1. One could however imagine that, in the assembled position, heel 63 of snap fit means 6 is simply flush with the first surface 51 of the guide means, so that it prevents protruding portion 61 from coming unhooked without, however, exerting a permanent pressing force.

The securing method and device according to the invention consequently reinforce the snap fit hold, to prevent bezel 1 from being forced out of position. Prototypes have been manufactured based on this model and a mean holding force of around 15 Newtons (N) has been observed. To make it even more difficult to force bezel 1 out of position, the bezel could be embedded in case 3 after the snap fit step. Those skilled in the art will understand that this variant can easily be performed, for example, by introducing adhesive into recess 4 of case 3 when bezel 1 is assembled to crystal 2, as illustrated in FIG. 5, although in the embodiment illustrated by FIG. 5 no fixing means are visible in recess 4 of case 3.

During the snap fit step where snap fit means 6 are slightly deformed outwards, the axial positioning of crystal 2 with respect to the bezel is ensured by axial positioning means 13*a* and 213*a* arranged respectively on the bottom of bezel 1, in the extension of the surface of inner bezel face 13, and on the top face 213 of peripheral crystal edge 21. These means prevent any outward movement of bezel 1 once they reach a stop in relation to each other. They thus ensure that lateral play is limited once the snap fit operation has been performed. According to the illustrated preferred embodiment, axial positioning means 231*a* of crystal 3 consists of four small flanges arranged on each of the top faces 213 of the peripheral crystal edge, visible in the preceding FIGS. 1, 3 and 4, whereas axial positioning means 13*a* of the bezel consists of an annular flange visible in FIG. 2. The cross-sectional view of FIG. 5 illustrates the axial stop member formed by the flanges of crystal 2 when bezel 1 tends to move towards the exterior of case 3 following the deformation of snap fit means 6. As the direction of assembly 8 presses inner face 13 of the bezel against the top face of the peripheral edge of crystal 2, the flanges formed by axial positioning means 13*a*/213*a* do not necessarily need to be very thick since the risk of the bezel jumping over axial positioning means 213*a* of crystal 2 is relatively low given that the pressing force is exerted in the opposite direction. One could, however, note that these 4 flanges also serve to enable the bezel to deform vertically by leaving play between the inner face 13 of the bezel and the top face 213 of the peripheral edge of crystal 2. This play specifically allows the bezel to deform in direction of assembly 8 and enables protruding portion 61 of the snap fit means to move below the snap fit surface 211 of the crystal.

According to the embodiment illustrated in FIG. 5, it can be observed that the peripheral edge 15 of bezel 1 contains a recessed part 16, used to facilitate the elastic deformation of the clip, i.e. of snap fit means 6 of the bezel. This recessed part 16 could be more or less deep depending upon the flexibility required for snap fit means 6. The shape of recess 16 may also be selected to be substantially complementary to that of guide means 5, so that the guide means can be covered once the snap fit operation has finished. Those skilled in the art will understand that other variants can be envisaged using different geometrical shapes from those illustrated, and different, more or less oblique orientations of the surfaces used, notably for the snap fit. The solution of the invention is also suited to a solution with mixed materials for crystal 2 and bezel 1. Crystal 2 could thus be formed for example of a relatively hard material or plastic, while bezel 1 could for example be made of metal, without thereby increasing the play of the assembled parts in relation to each other.

What is claimed is:

1. A method of securing a watch bezel of a watch, wherein the watch includes a case and a crystal, and the method includes the steps:

(a) snap fitting the watch bezel onto the crystal of the watch, wherein snap fit means of the bezel are guided by guide means arranged on the case during the snap fitting, and the guide means also serve as means for holding the snap fit means against the crystal.

2. The method of securing a watch bezel according to claim 1, wherein the method further includes, prior to step (a), the step of (b) securing said crystal to said case.

3. The method of securing a watch bezel according to claim 2, wherein axial positioning of said crystal relative to said bezel is ensured by axial positioning means arranged respectively on an internal face of the bezel and on a top face of a peripheral edge of the bezel during the snap fitting of step (a).

4. The method of securing a watch bezel according to claim 3, wherein step (a) includes in an elastic deformation of said snap fit means, then positioning a snap fit surface of said snap fit means underneath a snap fit surface of the crystal located on a peripheral edge of the crystal.

5. The method of securing a watch bezel according to claim 4, wherein said snap fit means of said bezel is guided during step (a) partly towards an interior of said case by a first surface of said guide means, wherein the first surface of said guide means is oblique relative to a direction of assembly.

6. The method of securing a watch bezel according to claim 5, wherein said bezel is embedded in said case, after the step (a).

7. A watch comprising a device for securing a watch bezel of the watch, wherein the watch includes a case and a crystal, and the device comprises the bezel that includes snap fit means and the case includes guide means for guiding the snap fit means to snap fit the bezel onto the crystal, and the guide means also serve as means for holding the snap fit means against the crystal.

8. The watch comprising the device for securing a watch bezel according to claim 7, wherein said snap fit means are located on a peripheral edge of said bezel and wherein the guide means are located in a recess at a periphery of said case.

9. The watch comprising the device for securing a watch bezel according to claim 8, wherein said snap fit means forms a single unit with said bezel and contains a protruding portion on which at least one snap fit surface is arranged.

10. The watch comprising the device for securing a watch bezel according to claim 9, wherein said guide means forms a single unit with said case.

11. The watch comprising the device for securing a watch bezel according to claim 10, wherein the bezel covers said peripheral edge of said crystal, and an internal lateral edge of the bezel is flush with an external lateral edge of said crystal, and a top external edge of said crystal extends a top an external face of said bezel.

12. The watch comprising the device for securing a watch bezel according to claim 11, wherein at least one or more of the bezel, crystal and the case are formed of plastic material.

13. The watch comprising the device for securing a watch bezel according to claim 12, wherein the bezel includes axial positioning means arranged on an internal face of the bezel, and said crystal includes axial positioning means arranged on a top face of a peripheral edge of the bezel.

14. The watch comprising the device for securing a watch bezel according to claim 13, wherein said guide means includes a first guide surface substantially parallel to the snap fit surfaces of said bezel and said snap fit means.

* * * * *